March 3, 1964 D. L. BARNUM ETAL 3,123,208
PACKAGING AND DISPLAY DEVICE AND METHOD FOR
PACKAGING AND DISPLAYING SPECTACLE FRAMES
Filed Oct. 31, 1962 2 Sheets-Sheet 1
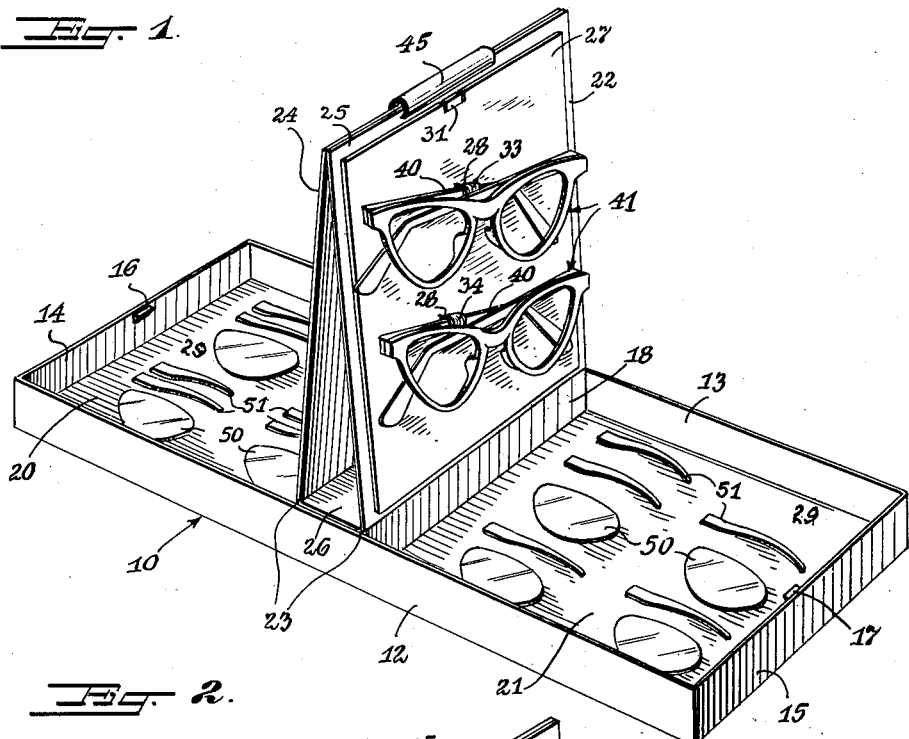
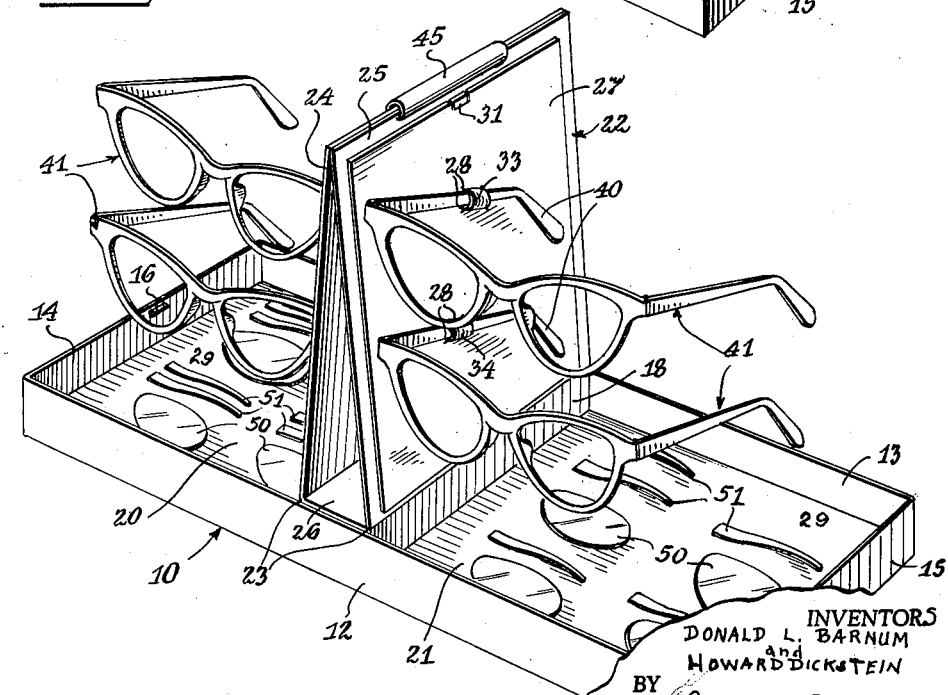
INVENTORS
DONALD L. BARNUM
and
HOWARD DICKSTEIN
BY
Angelo L. Pisarra
ATTORNEY.

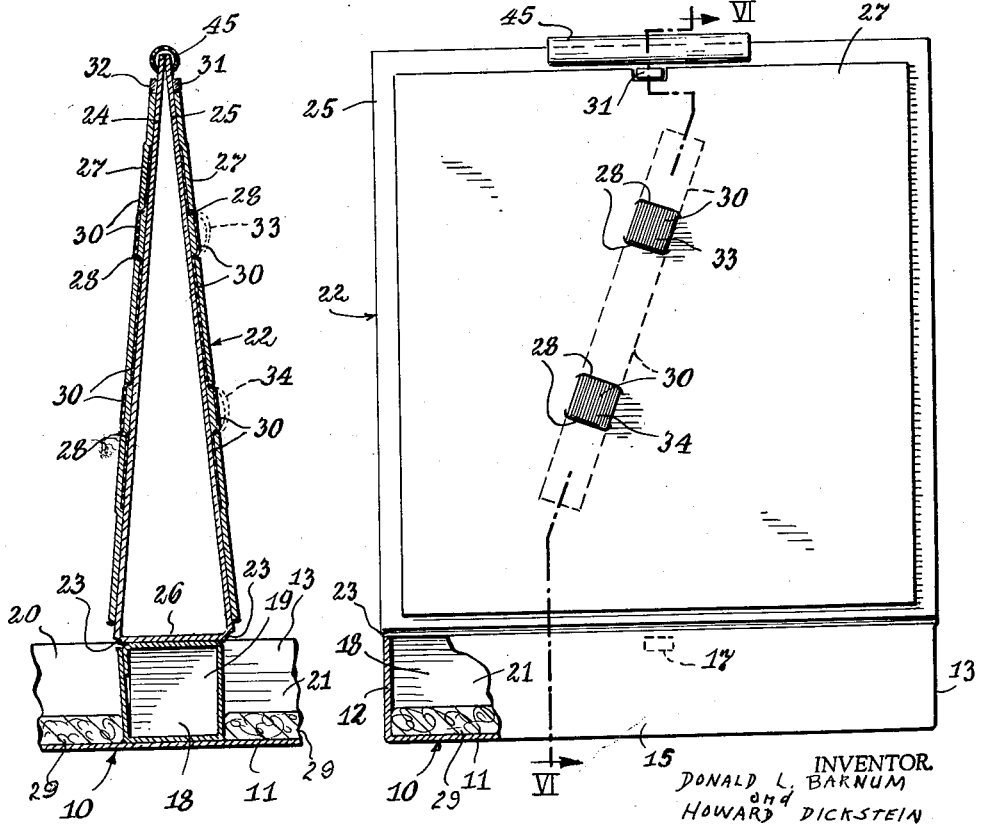

United States Patent Office 3,123,208
Patented Mar. 3, 1964

3,123,208
PACKAGING AND DISPLAY DEVICE AND METHOD FOR PACKAGING AND DISPLAYING SPECTACLE FRAMES
Donald L. Barnum, Port Chester, N.Y., and Howard Dickstein, Westport, Conn., assignors to Liberty Optical Manufacturing Co. Inc., Newark, N.J., a corporation of New Jersey
Filed Oct. 31, 1962, Ser. No. 234,335
3 Claims. (Cl. 206—45.14)

This invention relates to novel containers and display devices and is more especially directed to novel container and display devices for spectacle frames and also to novel combinations of spectacle frames therewith whereby said frames may be contained therein and also may be attractively displayed. This invention is also directed to novel methods for displaying spectacle frames and for packaging said frames when not in display position.

The main object of this invention is to provide a simple container and display device for spectacle frames, which in closed position is neat and compact and which in open position supports spectacle frames both in closed condition and open condition for display. Another object of this invention is the novel combination of spectacle frames and said container and display device. Still another object of this invention is the methods for displaying and packaging spectacle frames.

The foregoing as well as other objects and advantages of this invention will be readily apparent from the following description and drawings, wherein;

FIG. 1 is a perspective view of the novel container and display device in open and display condition, showing the spectacle frames carried thereby in collapsed condition after opening or before closing said device.

FIG. 2 is a view similar to FIG. 1 but is fragmentary and shows the spectacle frames carried thereby in open-display condition.

FIG. 3 is a fragmentary vertical cross sectional view of the container and display device per se together with the tray liner support therein shown in FIG. 1, but with the covers thereof in closed position.

FIG. 4 is a cross sectional view taken on line IV—IV of FIG. 3 in the direction of the arrows.

FIG. 5 is a perspective view of a retainer or coupling element.

FIG. 6 is a fragmentary vertical cross sectional view similar to FIG. 3 but with the covers in open position.

FIG. 7 is an end view of FIG. 6.

In the embodiment illustrated in the drawings, the novel packaging and display device comprises a rectangular, elongated, shallow, rigid tray 10 consisting of an elongated rectangular bottom 11, sides 12 and 13 and ends 14 and 15 all of which are composed of cardboard and are paper-covered and securely bound to each other. The inner face of end 14 has a small element 16 of magnetizable material, such as soft iron, secured thereto near the free edge thereof and the inner face of end 15 has a small element 17 of permanently magnetized material such as Alnico V secured thereto near the free edge thereof. Located in said tray 10, disposed at the midlength thereof and extending across substantially the entire width thereof is a rigid rectangular tube 18. The tube 18 consists of four elongated rectangular sides composed of cardboard and being paper-covered. The length of each of the sides of tube 18 is approximately equal to the width of bottom 11 and the width of each side of tube 18 is approximately equal to the internal depth of the tray 10. The ends of the tube 18 have square cardboard closure elements 19 located therein and adhesively secured thereto and serve as reinforcing elements for said tube. So disposed closed tube 18 is adhesively secured to the upper face of the tray bottom 11 to maintain it securely in the aforesaid position at the aforesaid location thus to compartmentize said tray into two separate and individual like compartments 20 and 21.

Coupled with said compartmentized tray 10 is an element 22. The element 22 is a rectangular cardboard element whose outer face is paper-covered. The length and width of the element 22 are the same or slightly greater than the corresponding dimensions respectively of the interior of tray 10. The normally bottom face of the midlength of the element 22 is scored or only partially cut-through along the entire width thereof along two straight lines 23 which are parallel and spaced from each other a distance corresponding to the widthwise dimension of the tube 18 thereby to divide said element 22 into two elements 24 and 25 of the same size hingedly coupled to narrow strip 26 between the score lines 23. A card-board cover sheet 27 is coupled with each of the elements 24 and 25. The widthwise and lengthwise dimensions of each cover sheet 27 is materially less than the corresponding dimensions of the elements 24 and 25. Each sheet 27 has a plurality of sets of cut-outs or slits 28 extending through the thickness thereof. The cut-outs 28 in each sheet 27 are preferably in the same straight line which is at an acute angle to the base line of sheet 27. Each set of cut-outs 28 is a pair of cut-outs which are relatively close to each other when compared with the distance between each set or pair of cut-outs. A narrow strip or band 30 of woven or other type of elastic material such as rubber or the like is coupled with each of said sheets 27 to provide a pair of elastic holding or securing means 33 and 34 on the front face of each sheet 27. The elastic band 30 is threaded through the individual cut-outs 28 of each pair of cut-outs and the ends thereof are anchored to the rear face of the sheet 27 by the use of a suitable adhesive. The sheets 27 having said elastic bands secured thereto are adhesively coupled to the normally bottom faces of the hinged elements 24 and 25. This sub-combination is permanently coupled with the compartmentized tray 10. This coupling may be readily effected by adhesively securing the normally inner face of the strip 26 between the score lines 23 to the outer face of the upper side of the tube 18 whose longitudinal edges are coincident with said score lines 23. Secured to the inner face of the element 25 near the free extremity thereof is a small piece 32 of permanently magnetized material, such as Alnico V and secured to the inner face of the element 24 near the free extremity thereof is a small piece 31 of a magnetizable material, such as soft iron. Each of the compartments 20 and 21 is provided with a liner support 29 which may be composed of foamed polyurethane resin or other material.

With the element 22 permanently coupled with the tray 10 in the manner heretofore set forth and with the combined elements 24—27 and 25—27 each having coupled therewith a pair of resilient temple holding and coupling elements or loops 33 and 34 for demountably coupling the temples of spectacle frames thereto, the novel container and display device is ready for use. A temple 40 of the complete spectacle frames 41, each consisting of a frame front having temples 40 hingedly secured thereto are inserted between sheet 27 and resilient couplers 33 and 34 respectively and is located entirely within the width of the element 25. Due to the distance between couplers 33 and 34, the pair of frames so carried by the combined elements 25—27 are located within the area of element 25 and are spaced from each other. Another pair of frames are so carried by the combined elements 24—27, are located within the area of element 24 and are spaced from each other. The width of the tray 10 of the preferred embodiment is only slightly greater than the maximum length of conventional spectacle frames when the temples thereof are in collapsed condition as shown in FIG. 1.

By virtue of this novel combination, the frames on elements 24—27 and those on elements 25—27 may be readily collapsed in the conventional collapsed condition and are in that condition as shown in FIG. 1 securely maintained thereon in spaced relationship to each other to provide an attractive display. Ordinarily, this is not the preferably manner of display which will hereafter be described but is the manner in which the frames are conditioned for packaging. With the frames so mounted and in such collapsed condition, the elements 24 and 25 are in closed position to cover the compartments 20 and 21. When in said position (as shown in FIG. 3 with no showing of the frames coupled therewith), the elements 17 and 31 and the elements 16 and 32 are magnetically coupled thereby to maintain said covers 24 and 25 in latched packaging condition. When it is desired to display said frames carried by the covers 24 and 25, the elements 24 and 25 carrying the frames in collapsed condition, are swung upwardly to attain the position shown in FIG. 1. In that position, which is a display position, the free ends of the covers 24 and 25 are latched together due to the magnetic coupling of elements 31 and 32 and together with element 26 form a triangular display stand supported by tray 10 as shown in FIG. 1. The more preferable display of the frames carried by the covers 24 and 25 is effected by merely moving the frame fronts about the hinges of the temples retained by the loops 33 and 34 and then swinging outwardly the other temples thereof. In this manner there is provided the novel combination of display device and frames in open position as shown in FIG. 2.

If desired the elements 16, 17, 31 and 32 may be omitted and when omitted, a removable slit tube 45 of rubbery or rubber plastic material may be employed to couple the free ends of the elements 24 and 25 as shown in FIGS. 1 and 2.

Also if desired, there may be mounted on the liners 29 a plurality of spectacle brow bar ornamentation pieces 51 which may be of the same or different colors and designs and also lens or lens simulating elements 50. The pieces 51 are elements which may be later, if desired secured to the brow bars of the spectacle frames.

In the combinations shown in the drawings, there is provided a tray 10 which serves as a display support for the elements 50 and 51 on liner 29, also as a part of a container and support for the spectacle frames removably carried by the covers 24 and 25 and in addition serves as a supporting base for the covers 24 and 25 when in open and inclined position while carrying the frames either in collapsed position as shown in FIG. 1 or open position as shown in FIG. 2.

While the invention has been described in detail, it is not to be limited to the exact construction shown, it being evident that various changes and modifications may be made without departing from the spirit thereof.

We claim:

1. A spectacle frame display device comprising a single, unitary, shallow tray, means located in said tray thereby dividing said tray into a plurality of like compartments, a pair of cover elements for said tray, said elements supported by said means and being swingable away from each other to cover said compartments and towards each other to uncover said compartments and dispose the free ends thereof near each other, means for maintaining the free ends of said cover elements near each other whereby said cover elements are maintained in inclined positions, means carried by each of said cover elements for accommodating temples of spectacle frames whereby spectacle frames may be securely held by said cover elements in open and collapsed condition.

2. A spectacle frame display device comprising a single, elongated, unitary and shallow tray whose widthwise dimension is only a little greater than the maximum lengthwise dimension of conventional spectacle frames when in collapsed condition, a divider of considerable width located in and secured to said tray at about the mid-part thereof thereby dividing said tray into a pair of like compartments, a pair of cover elements carried by said divider, said elements being swingable downwardly to a position whereby said compartments become covered and being swingable upwardly to a position whereby said elements are in open inverted V position, means for maintaining said elements in said last position, a pair of resilient loops carried by each of said elements, said loops being disposed one below the other in the same straight line which is at an acute angle to the base of the element carrying said loops, each of said loops being capable of accommodating a temple of a spectacle frame and maintaining said frame in position with respect to said cover elements, said loops being spaced from each other a distance sufficient that said frames when coupled therewith and in collapsed position are spaced from each other.

3. The method for packaging and displaying spectacle frames comprising coupling the temples of spectacle frames with swingable cover elements supported by a unitary, shallow, multi-compartment elongated tray, collapsing said spectacle frames coupled with said elements and swinging in one direction said cover elements with the collapsed spectacle frames coupled thereto to closed position to cover said compartments and locate said collapsed spectacle frames therein, and swinging in the opposite direction said cover elements with said collapsed frames coupled therewith to locate the free ends of said elements near each other whereby said elements form an approximate inverted V and moving the frame fronts and free temples of said spectacle frames with respect to said temples coupled with said elements to render said spectacle frames in open position, collapsing said spectacle frames and swinging said cover elements with said collapsed frames carried thereby to closed position whereby said compartments are covered by said elements with said collapsed spectacle frame located therein.

References Cited in the file of this patent
UNITED STATES PATENTS

| | | |
|---|---|---|
| 401,974 | Smith et al. | Apr. 23, 1889 |
| 1,113,832 | Roth | Oct. 13, 1914 |
| 1,817,766 | Rhodes | Aug. 4, 1931 |
| 2,707,538 | Mayer | May 3, 1955 |
| 3,101,843 | Thompson | Aug. 17, 1963 |